United States Patent Office 3,017,987
Patented Jan. 23, 1962

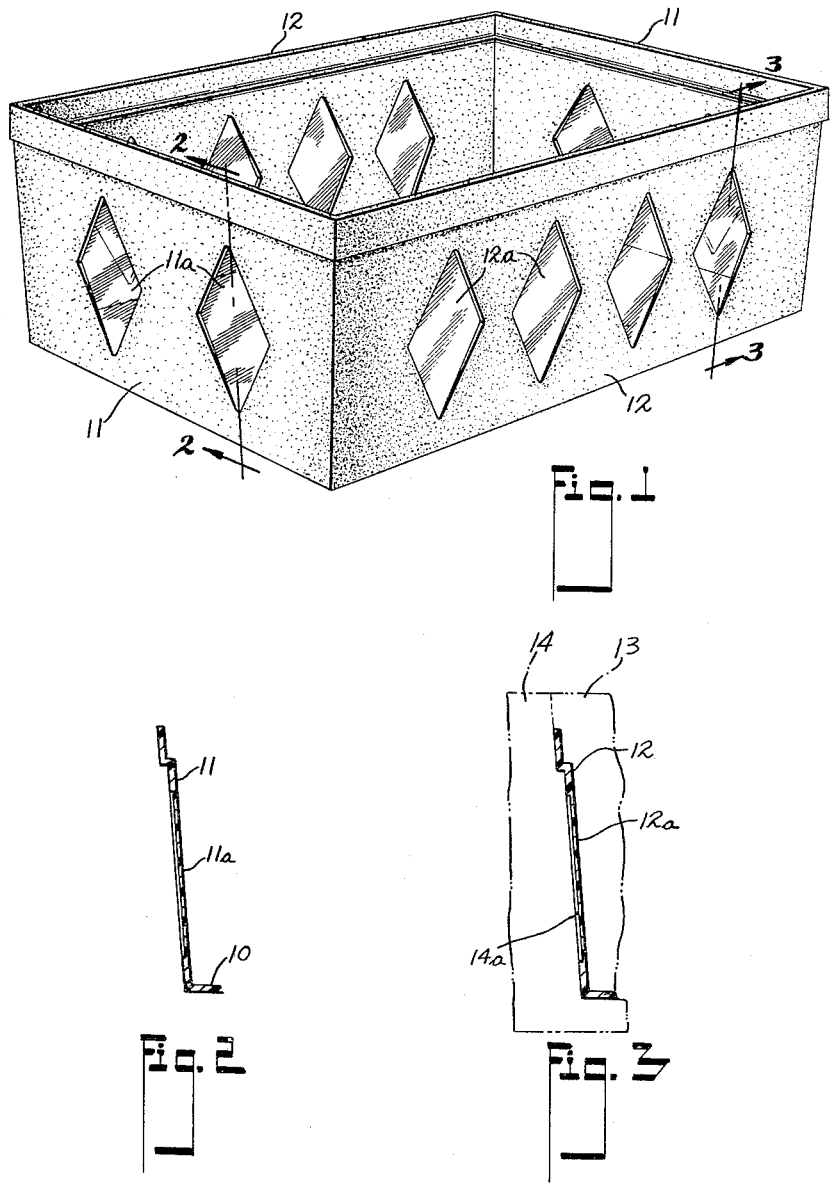

3,017,987
CONTAINER WITH TRANSPARENT WINDOWS
Ernest P. Moslo, 2443 Prospect Ave., Cleveland 15, Ohio
Filed Apr. 3, 1958, Ser. No. 726,172
1 Claim. (Cl. 206—45.31)

This invention relates to improvements in a container having an uninterrupted bottom and uninterrupted upstanding side walls extending completely around the bottom, these walls having window portions integral with the container walls and both the walls and the window portions being made of a synthetic resin material with wall portions outside of the window portions being of sufficient thickness to give stability to the container but causing these walls to be opaque due to the thickness of the synthetic resin there, while the window portions are of a such a thickness of the synthetic resin that they are of sufficient transparency to be seen through sufficiently to recognize the contents of the container.

One of the objects of the present invention is to provide a container of the type described above which may be molded in a single operation and which provides walls of the container for the most part of a thickness to be opaque but to give stability to the container while window portions in the container are of a less thickness whereby the synthetic resin material there is substantially transparent so that the contents of the container may be recognized through the window portions.

An object of the present invention is to provide a container which is commonly used to store food products in a refrigerator although other uses of the invention will occur to those skilled in this art.

Other objects and advantages of the invention are apparent from the accompanying drawings and description and the essential features thereof will be set forth in the appended claims.

In the drawings,

FIG. 1 is a perspective view of the completed container; while

FIGS. 2 and 3 are slightly enlarged transverse sectional views taken along the lines 2—2 and 3—3 respectively of FIG. 1; FIG. 3 having added to it a fragmentary showing in dot-dash lines of portions of a mold adapted to form the side walls of the container during a molding operation.

In the embodiment of my invention shown in the drawings, I have indicated a generally rectangular container having a bottom 10, end walls 11 and side walls 12, the bottom and side walls being uninterrupted and the side walls extending completely around the bottom so as to form a closed container. The container need not be rectangular but is shown in that form as this is quite common.

I form my improved container out of polyethylene or a synthetic resin having the qualities of polyethylene insofar as opacity and rigidity of the resin is concerned. I have discovered that a synthetic resin such as polyethylene having a thickness of approximately .025 inch and under is sufficiently transparent so that it can be seen through sufficiently to recognize the contents of the container. The window portions 11a in the end walls and 12a in the side walls are made .025 inch and under but preferably not less than .015 inch thick or they are too readily broken. Polyethylene of this thickness can be seen through sufficiently to recognize the contents inside of the container.

The wall portions 11 and 12 outside of the window portions have a greater thickness than the window portions because a complete container made of the thickness indicated for the window portions, namely, 0.025 inch and under, would not have sufficient rigidity or strength for actual use. I, therefore, prefer to make the walls outside of the window portions at least .035 inch thick and usually they are between .045 and .050 inch thick. This gives a strong container which holds its shape but the polyethylene of this thickness is opaque. In FIG. 1, I have stippled the wall portions outside of the window portions to indicate opacity and have shaded the window portions with parallel lines to indicate substantial transparency.

Another advantage of my invention is that the container when constructed according to my teachings may be molded in a single molding operation between male and female molds conforming to the inside and outside faces of the bottom and side walls of the container because the greatest difference in thickness between the window portions and the walls outside of and adjacent the window portions, according to the dimensions given above, will be .035 inch and the least difference would be .010 inch. To illustrate this I have indicated in FIG. 3 a male mold 13 having surfaces corresponding to the inner faces of the bottom and side walls and a female mold 14 having faces conforming to the outside walls of the bottom and side walls and this will include a slight projection at 14a where the face of the female mold extends toward the male mold by an amount equal to the difference in thickness between the window portion and the wall thickness adjacent an outside of the window portion. This projection 14a is of course the shape of the windows which may be almost any shape but are here shown as diamond-form for a pleasing appearance. It should be understood that the molds 13 and 14 completely enclose a space of exactly the shape of the container bottom and side walls and the container may then be extrusion molded in the usual fashion. Then the male mold 13 will be removed from the finished container and there is sufficient flexibility in the polyethylene resin after it has set for the wall 12 to be flexed as shown in FIG. 3 so that the container walls will free themselves from the projections 14a of the female mold.

I have thus disclosed a container which may be molded in the usual fashion from synthetic resins to provide a container of sufficient thickness to have rigidity and long life with generally opaque walls but with portions of those walls of a thinner resin section forming window portions through which the contents of the container can be recognized.

What is claimed is:

A container having an uninterrupted bottom and uninterrupted upstanding side walls extending completely around said bottom, said walls having window portions integral therewith, said walls outside of said window portions being of polyethylene and of a thickness too great to be seen through, said window portions being of the same polyethylene and of a thickness to be seen through sufficiently to recognize the contents of the container, said walls outside of and adjacent said window portions being at least approximately .035 inch thick, said window portions being between approximately .015 to .025 inch thick, whereby said container may be molded in a single operation between male and female molds conforming to the inside and outside faces of said walls, said container having sufficient flexibility to permit said window portions to be stripped from said mold after the polyethylene is set, said walls having sufficient rigidity to generally maintain a box-like shape to the container.

References Cited in the file of this patent
UNITED STATES PATENTS

| | | |
|---|---|---|
| 1,419,509 | Newell | June 13, 1922 |
| 2,463,743 | Cary et al. | Mar. 8, 1949 |
| 2,514,432 | Whitford | July 11, 1950 |
| 2,695,115 | Roop | Nov. 23, 1954 |
| 2,767,755 | Hill | Oct. 23, 1956 |
| 2,768,667 | Hill | Oct. 30, 1956 |
| 2,790,576 | Lawrence | Apr. 30, 1957 |
| 2,873,566 | Sylvester et al. | Feb. 17, 1959 |